(12) United States Patent
Szymański

(10) Patent No.: US 8,419,131 B2
(45) Date of Patent: Apr. 16, 2013

(54) SEAT WITH LOCKING MECHANISM

(76) Inventor: Maciej Szymański, poczta Rokientnica (PL)

( * ) Notice: Subject to any disclaimer, the term of this patent is extended or adjusted under 35 U.S.C. 154(b) by 201 days.

(21) Appl. No.: 13/001,121

(22) PCT Filed: Jun. 30, 2009

(86) PCT No.: PCT/PL2009/000071
§ 371 (c)(1),
(2), (4) Date: Mar. 3, 2011

(87) PCT Pub. No.: WO2010/002282
PCT Pub. Date: Jan. 7, 2010

(65) Prior Publication Data
US 2011/0148165 A1  Jun. 23, 2011

(30) Foreign Application Priority Data

Jul. 4, 2008 (PL) .......................... 385585

(51) Int. Cl.
*A47C 1/024* (2006.01)

(52) U.S. Cl.
USPC ................................ 297/344.13; 297/344.15

(58) Field of Classification Search ............. 297/344.13, 297/344.15
See application file for complete search history.

(56) References Cited

U.S. PATENT DOCUMENTS

| | | | | |
|---|---|---|---|---|
| 4,765,582 A * | 8/1988 | Babbs | .................. | 297/344.13 X |
| 5,048,893 A | 9/1991 | Cowan et al. | | |
| 6,488,337 B1 * | 12/2002 | De Voss et al. | .......... | 297/344.13 |
| 6,843,460 B2 * | 1/2005 | Koga et al. | ........... | 297/344.13 X |
| 7,140,682 B2 * | 11/2006 | Jaeger et al. | ......... | 297/344.15 X |
| 7,240,965 B2 * | 7/2007 | Messerschmidt et al. | ........................ | 297/344.15 |
| 7,390,062 B2 * | 6/2008 | Hahn | ....................... | 297/362.13 |
| 7,533,936 B2 * | 5/2009 | Ujimoto et al. | .......... | 297/344.13 |
| 7,631,939 B2 * | 12/2009 | Wulf et al. | ............... | 297/344.13 |
| 7,861,994 B2 * | 1/2011 | Yamada et al. | ...... | 297/344.13 X |
| 2002/0163234 A1 | 11/2002 | Hancock | | |
| 2007/0007807 A1 * | 1/2007 | Hahn | ....................... | 297/344.12 |
| 2010/0283303 A1 * | 11/2010 | Alfredsson et al. | ...... | 297/344.13 |

FOREIGN PATENT DOCUMENTS

EP  0995372 A  4/2000
EP  1192876 A  4/2002

* cited by examiner

*Primary Examiner* — Rodney B White
(74) *Attorney, Agent, or Firm* — Egbert Law Offices, PLLC

(57) ABSTRACT

A seating apparatus has a seat with a seat frame, a backrest extending upwardly from said seat, a support mechanism mounted to the seat frame, a locking mechanism cooperative with the support mechanism, said a lock cooperative with the locking mechanism. The locking mechanism has an upper arm mounted rotationally to the seat frame and to the support mechanism. The lock is affixed to at least one of the first and second arms and extends outwardly of a side of the seat. The lock is suitable for locking a position of the arms and the seat frame.

5 Claims, 3 Drawing Sheets

SEAT WITH LOCKING MECHANISM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The subject of the invention is a seat, used in vehicles, offices and other places where a frequent change of the seating position is required in order to adjust to the user's requirements.

2. Description of Related Art Including Information Disclosed Under 37 CFR 1.97 and 37 CFR 1.98

The technical and operational requirements concerning the driver's seats, which increase the comfort of use, besides the seating inclination angle, also determine the angles of inclination of the seating compared to level, within (+/−) 10°. The change of the position of the seat should be performed as quickly as possible and without the use of force on the part of the driver.

Previous solutions have used eccentric mechanisms for the positioning of the seat. Screw mechanisms were also used, as well as locking slide mechanisms.

These solutions, in order to improve the comfort of use, were also implemented in office seats, leisure seats and others.

In all such solutions the positioning is performed by changing the relative position of screw mechanisms, eccentric mechanisms or slide mechanisms, without the possibility of initial positioning of the seat by the user's body balance. The change of the position of the seat usually required the user to raise above the seat.

BRIEF SUMMARY OF THE INVENTION

The solution presented eliminates these flaws and disadvantages. The essence of the invention, which is a seat formed from a seating part and a backrest part, placed on rotational mechanisms, with elements which lock these mechanisms in the seat frame, placed on support mechanisms, which are mechanisms used for raising and longitudinal sliding, includes placing the seating frame on side connectors, mounted to the supporting mechanism in such a manner that the rotation axis of the bolt on which the seat frame is mounted is placed approximately on a vertical axis passing through the user's centre of gravity and is positioned by a locking mechanism with a lock.

It is advantageous when the locking mechanism with a lock is placed on the rotation axis of the mounting bolt of the seat.

It is also advantageous when the locking mechanism includes support arms mounted to the support mechanism and to the seat frame, whereas the upper arm mounted rotationally on the axis to the seating frame is connected with the lower arm, mounted rotationally on support mechanisms, and besides one of the support arms, at least on one side has a lock for setting the position of the arms in question and of the seating frame.

It is also advantageous when the mounting axis of the support arms and the axis of the degree of regulation lock are placed behind the axis of rotation of the seating.

It is also advantageous when the installation axes of the support arms and the axis of the degree of regulation lock are placed in front of the axis of rotation of the seating.

It is additionally advantageous when the locking mechanism with the lock locks the upper support arm.

Due to the use of the seat presented in this invention the following technical and operational effects were obtained:
- the ability to position the seat by balancing the user's body, without having to raise oneself from the seat,
- the ability to place the support arms in any place along the length of the side connectors,
- the ability to place the support arms both before and after the axis of rotation of the seating, depending on the construction requirements of the seat mechanisms,
- the ability to place the locking mechanism in the zone near to support arms,
- the ability to use any mechanism locking the seating,
- the ability to use also in seats which have the seating part permanently connected with the backrest part,
- easy operation of seating positioning,
- high comfort of use, and
- low costs of manufacture.

BRIEF DESCRIPTION OF THE DRAWINGS

The invention, in an example implementation, which is not the only possible implementation, is shown in schematic drawings, which present the load-bearing frames of the backrest and seating parts.

DETAILED DESCRIPTION OF THE INVENTION

Figure 1A:
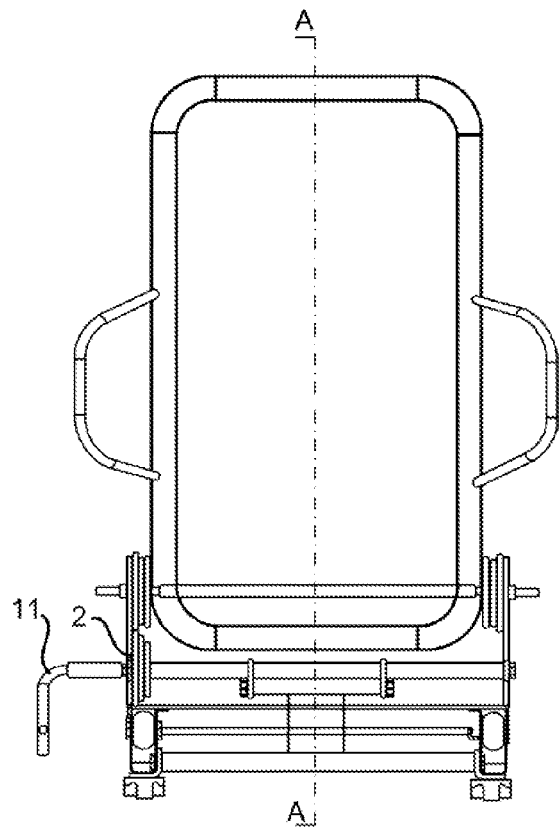
FIGS. 1a and 1b show schematic views of a seat wherein the mounting axis of the support arms and the axis of the degree of regulation lock are placed behind the axis of rotation of the seating.

The seat has a seating part and a backrest part, not shown on the drawing. The seating is mounted on rotational mechanisms 1, with locking elements 2 which lock these mechanisms in the seat frame. The seat frame is placed on support mechanisms 3, which are mechanisms used for raising and longitudinal sliding. On each of the side connectors 4, mounted to the supporting mechanism 3, there are bolts 5 the axis of which is placed approximately on a vertical axis passing through the user's centre of gravity and on which the seating frame 6 is mounted rotationally. The frame 6 has an upper arm 8 mounted rotationally on the axis 7, which arm is connected through the axis 9 with the lower arm 10, which is mounted rotationally on support mechanisms 3, whereas at least one of the arms S, 10 on at least one side of the seat has a lock 11 used for locking the position of the arms 8, 10 and the frame 6 of the seating.

There are variants of the invention where the axis of rotation 5 of the seat is located between the ends of the side connectors 4.

Figure 1B:
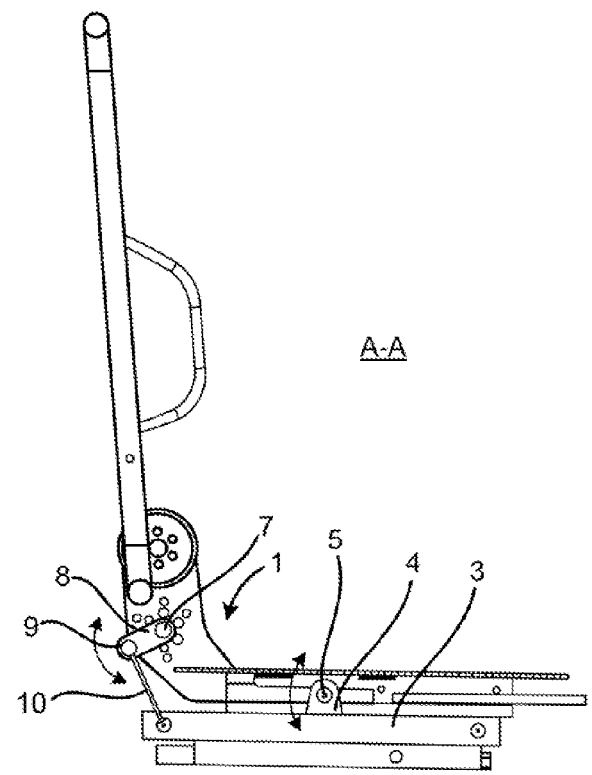

In one of the variants of the invention, shown on FIG. 1, the mounting axes of the arms 8, 10 and the axis of the degree of regulation lock 11, are placed behind the axis of rotation 5 of the seating.

Figure 2A:
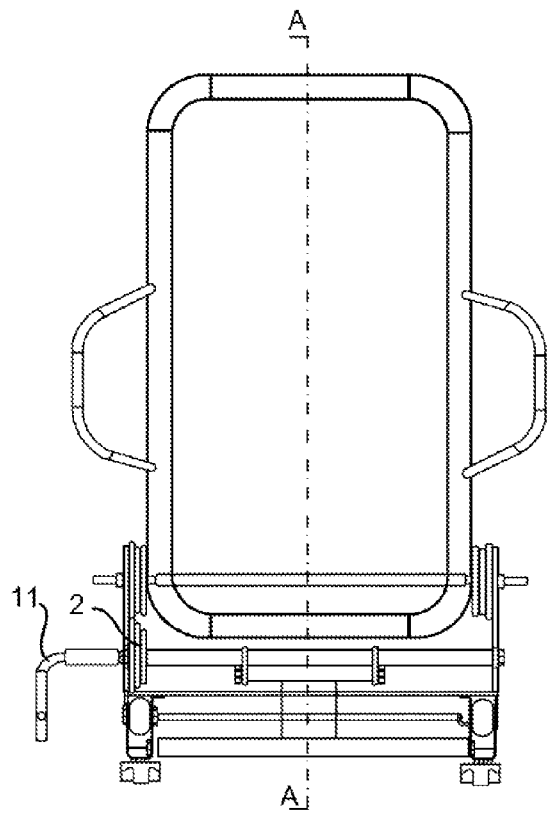
FIGS. 2a and 2b show schematic views of a seat wherein the mounting axis of the support arms and the axis of the degree of regulation lock are placed in front of the axis of rotation of the seating.
Figure 2B:
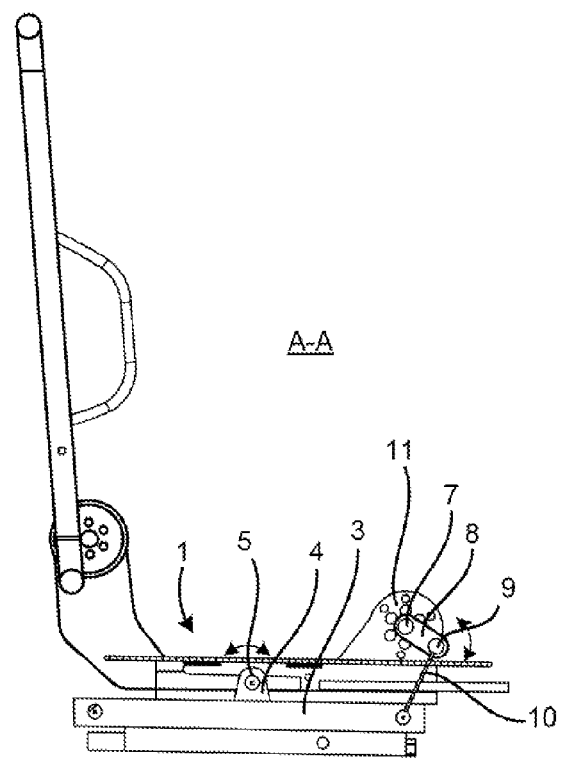

In another variant, shown on FIG. 2, the mounting axes of the arms 8, 10 and the axis of the degree of regulation lock 10, are placed in front the axis of rotation 5 of the seating.

Figure 3A:
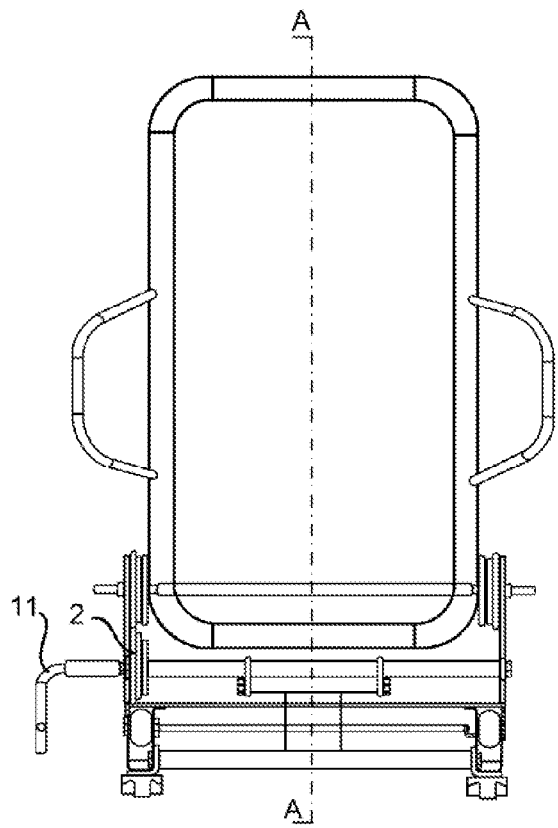
FIGS. 3a and 3b show schematic views of a seat wherein the mounting axis of the support arms and the axis of the degree of regulation lock are placed in the axis of rotation of the seating.
Figure 3B:
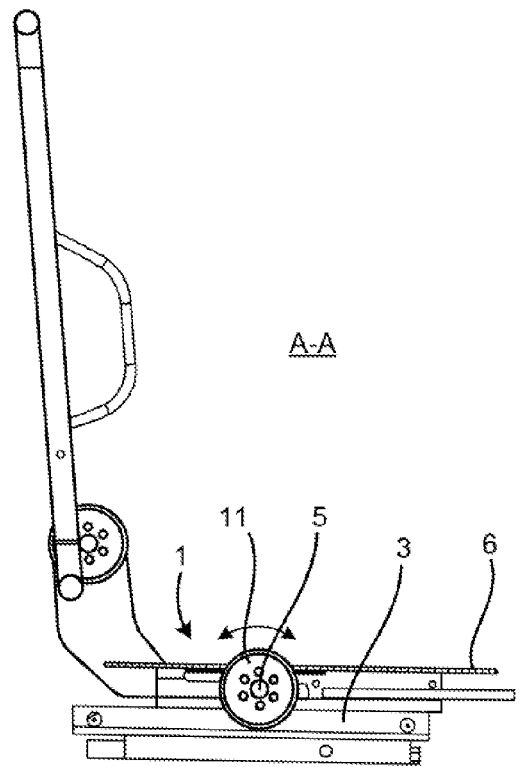

In another variant, shown on FIG. 3, the mounting axes of the arms 8, 10 and the axis of the degree of regulation lock 11, are placed on the axis of rotation 5 of the seating.

In these variants the locking mechanism which uses the lock 11 locks the upper arm 8 or locks the lower arm 10.

In order to place the seating of the seat in a position which is satisfactory to the user, the user should sit down in the seat and use the lock 11 to unlock the locking mechanism 2. The optimum position of the seating is then set by balancing with body, and then the locking mechanism 2 is locked.

In the variants with support arms 8, 10 after sitting down in the seat the lock 11 is used to unlock the locking mechanism 2. The optimum position of the seating is then set by balancing with body, and then the locking mechanism 2 is locked, setting the relative position of the arms. This position sets the angle of the seating for the next period of operation of the chair.

I claim:

1. An apparatus comprising:
a seat having a seat frame;
a backrest extending upwardly from said seat;
a support mechanism mounted to said seat frame, said support mechanism having side connectors with bolts respectively extending therethrough, said bolts being connected to said seat frame, said support mechanism suitable for raising said seat and for longitudinally sliding said seat, said bolts each having an axis of rotation suitable for passing through a center of gravity of a user of the apparatus;
a locking mechanism cooperative with said support mechanism for fixing a position of said seat frame, said locking mechanism having a pair of arms mounted to said support mechanism and to said seat frame, an upper arm of said pair of arms being mounted rotationally to said seat frame on a first axle and connected to a second axle of a lower arm of said pair of arms, said lower arm mounted rotationally to said support mechanism; and
a lock affixed to at lest one of said upper arm and said lower arm, said lock extending outwardly of a side of said seat, said lock having a portion aligned with said axis of rotation of the bolt, said lock suitable for locking a position of said pair of arms and said seat frame.

2. The apparatus of claim 1, said pair of arms positioned behind the axis of rotation of said bolts.

3. The apparatus of claim 1, said pair of arms positioned in front of the axis of rotation of said bolts.

4. The apparatus of claim 1, said lock suitable for locking said upper arm.

5. The apparatus of claim 1, said lock suitable for locking said lower arm.

* * * * *